United States Patent [19]
Hori

[11] 3,802,674
[45] Apr. 9, 1974

[54] APPARATUS FOR CAUSING INTIMATE CONTACT BETWEEN GAS AND LIQUID

[76] Inventor: Shoichiro Hori, 291 Yukigaya, Ota-ku, Tokyo, Japan

[22] Filed: Nov. 19, 1970

[21] Appl. No.: 91,216

Related U.S. Application Data

[62] Division of Ser. No. 761,093, Sept. 20, 1968, abandoned.

[52] U.S. Cl. ............................................. 261/93
[51] Int. Cl. ............................................. B01f 3/04
[58] Field of Search ......... 261/87, 84, 93, 121, 123; 55/86, 230; 259/23, 24, 25, 26, 5–10; 210/221, 220

[56] References Cited
UNITED STATES PATENTS

| | | |
|---|---|---|
| 2,055,065 | 9/1936 | Booth .................................. 261/93 |
| 2,183,071 | 12/1939 | Guthrie et al ....................... 261/93 |
| 2,853,280 | 9/1958 | Cusi ..................................... 261/93 |

FOREIGN PATENTS OR APPLICATIONS

| | | |
|---|---|---|
| 185,196 | 5/1907 | Germany ..................... 261/114 R |
| 676,270 | 5/1939 | Germany ............................ 261/93 |
| 503,165 | 4/1939 | Great Britain ..................... 261/93 |

*Primary Examiner*—Bernard Nozick
*Attorney, Agent, or Firm*—Fidelman, Wolffe, Leitner & Hiney

[57] ABSTRACT

This invention relates to an apparatus for causing intimate contact of gas with liquid. An intake pipe of gas is equipped near a cylinder which revolves rapidly in liquid. The gas flown into the liquid is encircled the revolving cylinder in the form of film, and then it is atomized into fine innumerous bubbles which pass up in the liquid, thus effecting of the gas intimate contact with the liquid. Consequently the absorption velocity or the reaction velocity of gas with liquid (slurry or solution) is accelerated.

6 Claims, 5 Drawing Figures

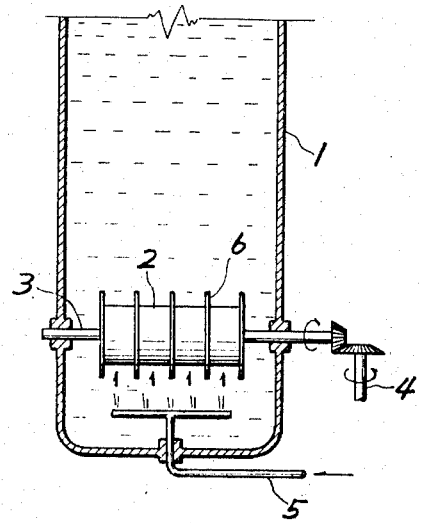
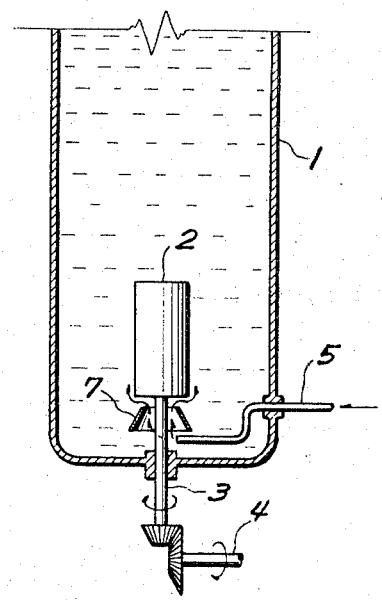
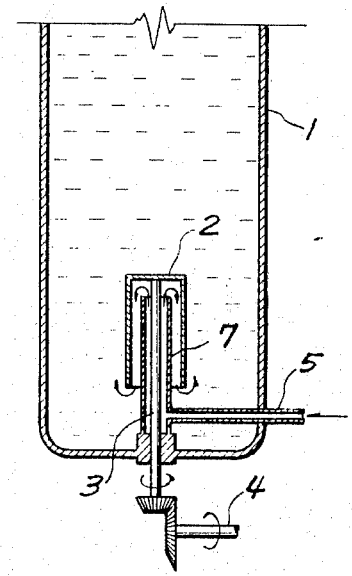
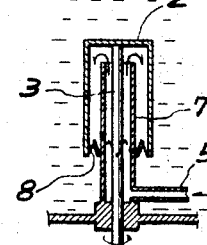
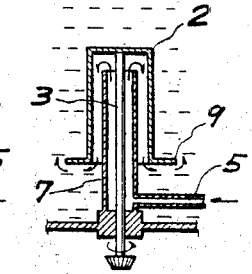

APPARATUS FOR CAUSING INTIMATE CONTACT BETWEEN GAS AND LIQUID

This is a division of Ser. No. 761,093 filed 9/20/68 now abandoned.

The present invention relates to an apparatus for causing contact between gas and liquid.

Previously, there have been several propositions made known as to a method of effecting intimate contact between gaseous material and liquid material, by extending the contact surface between them; for instance, there is a method in which, 1. gas is blown into liquid through openings bored in the wall of a hollow shaft of propeller type agitator, or through openings bored in the wall of a hollow propeller, to bring gas into intimate contact with liquid; or a method;

2. in which, gas is blown into liquid through fine pores of an unglazed porcelain plate and bring gas into intimate contact with liquid by causing gas to form numerous fine bubbles; or a method;

3. in which, gas is blown into liquid through larger holes (e.g 5-10 mm in dia.) bored in the wall of a hollow cylinder which revolves rapidly in liquid to cause the gas to atomize into numerous bubbles in the liquid.

However, the following defects are experienced in the above mentioned methods:

In the method 1), because of unequal height and different linear velocity of each hole bored in the wall of shaft or propeller, the uniformity in size of gas bubbles is not achieved, and bubbles are not fine enough. Accordingly, contact surface area of unit gas volume is not sufficiently great. Another defect is that the greater part of motive power is absorbed for agitation of the liquid rather than atomizing gas into fine bubbles. In the method 2), the resistance to gas passage through fine pores in unglazed porcelain is relatively great, and fine pores are easily clogged with fine dust, mist of lubricants or insoluble matters in gas and liquid, so that continuous and smooth operations are interrupted too often. In the method 3), the difficult soluble materials which previously exist or grow in the liquid to be treated, gradually accumulate inside the revolving cylinder and its smooth uniform revolution is hindered.

An object of the present invention is to provide apparatus in which one or more of these difficulties is reduced.

The invention consists in an apparatus for causing contact between gas and liquid including a vessel for containing the liquid, a cylinder located in the vessel and capable of revolving in liquid and an intake pipe for supplying gas into the liquid, the arrangement being such that the gas encircles the revolving cylinder in the form of a film due to the speed of revolution, and the film is then atomized into bubbles which pass into the liquid to effect contact with the liquid.

It is thus possible for the specific contact surface of gas and liquid to be increased facilitating very intimate contact and therefore effective chemical reaction between them.

In this invention, the revolving cylinder may be placed horizontally or vertically, and the shape of cylinder may be cylindrical, poli-angular, conical or of any type, the body of which may be hollow in order to save material and to make its handling and operation easier. The revolving cylinder may have ends made in the shape of spindle, and when the cylinder is hollow, one end of it may be closed while the other is open. It may also be placed upside down, in which case, the bottom open end may be jagged in the shape of saw teeth, and in another case, it may be reinforced with a rib, so as to facilitate uniform stirring.

The explanation of the present invention in reference to the attached drawings follows:

FIG. 1, is a vertical section of the apparatus equipped with a revolving cylinder, placed horizontally in a liquid tank.

FIG. 2, is a vertical section of the apparatus equipped with a revolving cylinder, placed vertically in a liquid tank.

FIG. 3, is a vertical section of the apparatus equipped with a revolving hollow cylinder, placed vertically with the bottom upside.

FIGS. 4, and 5 are partial sections of two variations of revloving cylinder.

In FIG. 1, the liquid tank (1) has a revolving cylinder (2), placed horizontally near the bottom. The shaft of revolving cylinder (3) revolves rapidly, driven by the motive power shaft (4). Through the intake pipe (5), gas is supplied from under the cylinder and as it is blown into the liquid through openings in the pipe, it is caught by the rapid revolution of the cylinder and forms a thin uniform film of gas and encircles the cylinder. Then the thin gas film is broken up an atomized into numerous fine bubbles by means of the splitting force of the revolving cylinder. The ribs (6) are provided in order to guide the gas flow and prevent the fine bubbles from becoming larger in size.

The ribs (6) may be separated from the cylinder, so as to prevent their revolution with the cylinder, if desired. By the use of this apparatus, the liquid in the reaction tank contacts with gas intimately as the latter is blown into the tank and is made to encircle the revolving cylinder in the form of this film, and then it is atomized into numerous fine bubbles which disperse all over the inside of the tank and chemical reaction between gas and liquid is greatly facilitated. In FIG. 2, the revolving cylinder (2) is placed vertically in the liquid tank (1) near the bottom. The shaft of the revolving cylinder (3) revolves rapidly, driven by the motive power shaft (4). Through the pipe (5), gas is supplied from under the revolving cylinder, and as guided by the guide plate (7), the gas is caught by the revolving cylinder and is made to encircle the revolving cylinder in the form of a thin film; and then the gas film is atomized into numerous fine bubbles by the splitting force caused by the rapid revolution of the cylinder, and are dispersed all over the inside of the tank, effecting intimate contact with the liquid and therefore facile chemical reaction.

In FIG. 3, the cylinder (2) is placed vertically with an open lower end in the liquid tank (1) near the bottom. Gas is supplied from the pipe (5) and is made to pass toward the center of the inside of the hollow cylinder through its open end, as guided by guide plate (7). As the cylinder revolves rapidly, the gas inside the tank finds its way through the open lower end and encircles the outside of the cylinder in the form of a film which is then atomized into numerous fine bubbles to disperse all over the inside of the tank (1). The cylinder revolves rapidly as it is driven by the motive power shaft (4).

Variations of the cylinder in FIG. 3 are shown in FIG. 4 and FIG. 5; in the former (FIG. 4), the open end 8 of the cylinder is jagged in the form of saw teeth, and in the latter (FIG. 5), the open end of the cylinder is reinforced with the rim (9).

The device in FIG. 4 aims at ensuring uniformity in gas dispersion as it is atomized into numerous fine bubbles, even when the gas flow rate varies, while the device in FIG. 5 aims at facilitating formation of gas film and animation of fine bubbles. The guide plate (7) prevents also solid matter from entering in between the shaft and the tank wall and helps to reduce wear and leakage of contacting parts. Example:

The liquid tank was 320 mm in diameter, 600 mm in height in the lower portion, and 200 mm in diameter and 2,000 mm in the upper portion. The revolving cylinder was 60 mm in diameter, 230 mm in length, and was placed vertically in the tank near the bottom which was filled with the solution of $(NH_4)_2SO_3$ solution in the tank, and oxydation of $(NH_4)_2SO_3$ was effected. The data obtained from the above experiment are shown in the following table.

| Concentration of Solution(C) mol/l | | Quantity of Solution l | Temperature °C | | Oxygen Velocity l/min | Oxidation Velocity $-\Delta$ c.min |
|---|---|---|---|---|---|---|
| Start | end | | start | end | | |
| 0.82 | 0.55 | 78 | 15 | 33 | 10.5 | 0.0052 |

In the above, the decrease in the concentration of $(NH_4)_2SO_3$ shows the rise in the concentration of $(NH_4)_2SO_4$, and $-\Delta$ C/min shows the velocity of oxidation of $(NH_4)_2SO_3$. The data show the effectiveness of this apparatus.

I claim:

1. An apparatus for causing contact between a gas and a liquid including a vessel containing the liquid, an axially rotatable hollow cylinder completely immersed in said liquid and positioned vertically in said vessel, at least the upper end of said cylinder being closed by a wall, a gas intake pipe extending into the cylinder, the output thereof being positioned in said vessel below said upper end of said cylinder and extending along the axis thereof, said pipe passing out of said vessel, gas feed means externally connected to said pipe providing gas to said pipe, and rotating means rotating said cylinder including a drive shaft coaxial with said cylinder, attached to said cylinder, and extending out of said vessel, gear means attached to said shaft external said vessel, and drive means engaging said gear means revolving said cylinder whereby, said cylinder and wall being inperforate whereby gas encircles said revolving cylinder in the form of a film and then is atomized into bubbles which pass into the liquid to affect contact therewith.

2. An apparatus as claimed in claim 1 wherein guide means are located below the cylinder to guide the gas from the intake pipe towards the cylinder, the pipe terminates outside the cylinder and the cylinder is closed at both ends.

3. An apparatus as claimed in claim 1 wherein the cylinder is located near the bottom of the vessel.

4. An apparatus as claimed in claim 1 wherein the cylinder is hollow, has an opening in its lower end and the intake pipe terminates inside the cylinder.

5. An apparatus as claimed in claim 4 wherein the open end of the cylinder is reinforced with a radially extending rim.

6. An apparatus as claimed in claim 4 wherein the open end of the cylinder is jagged in the form of saw teeth.

* * * * *